United States Patent
Cofield

(10) Patent No.: US 9,908,759 B1
(45) Date of Patent: Mar. 6, 2018

(54) ROLLING VEHICLE JACK

(71) Applicant: Lonnie Cofield, Copperpolis, CA (US)

(72) Inventor: Lonnie Cofield, Copperpolis, CA (US)

(*) Notice: Subject to any disclaimer, the term of this patent is extended or adjusted under 35 U.S.C. 154(b) by 0 days.

(21) Appl. No.: 15/255,270

(22) Filed: Sep. 2, 2016

(51) Int. Cl.
*B62B 3/06* (2006.01)
*B66F 5/04* (2006.01)
*B60B 19/14* (2006.01)

(52) U.S. Cl.
CPC ............... *B66F 5/04* (2013.01); *B60B 19/14* (2013.01)

(58) Field of Classification Search
USPC ................................. 254/2 B, 2 R, 93 R, 124
See application file for complete search history.

(56) References Cited

U.S. PATENT DOCUMENTS

| | | | |
|---|---|---|---|
| 3,952,998 A * | 4/1976 | Fletcher | B66F 19/00 254/124 |
| 5,441,237 A | 8/1995 | Sweeney | |
| 5,901,935 A | 5/1999 | Lai | |
| D456,975 S | 5/2002 | Ji | |
| 6,644,615 B1 | 11/2003 | Liu | |
| 7,207,548 B1 | 4/2007 | Howe | |
| 8,181,936 B2 | 5/2012 | Walton | |
| 9,676,599 B1 * | 6/2017 | Baker | B66F 3/25 |
| 2006/0225954 A1 * | 10/2006 | Sayles | E06C 1/39 182/20 |
| 2008/0181753 A1 | 7/2008 | Bastian et al. | |
| 2014/0097039 A1 * | 4/2014 | Kerr | E06C 7/182 182/39 |

FOREIGN PATENT DOCUMENTS

WO WO2004011357 2/2004

* cited by examiner

*Primary Examiner* — Joseph J Hail
*Assistant Examiner* — Shantese McDonald

(57) ABSTRACT

A rolling vehicle jack for elevating a vehicle includes a base. A spring is coupled to a top of the base and is positioned in an internal space of the base. A sphere is rollably coupled to the spring and selectively extensible through a penetration that is positioned through a bottom of the base. A lift is coupled to and selectively extensible from the top of the base. An actuator, positioned in the internal space, is coupled to the base and operationally coupled to the lift. The sphere is configured to roll on a surface such that the base is reversibly positionable under a vehicle. The actuator is positioned to motivate the lift to extend vertically from the base, wherein the sphere is retracted into the base. A vehicle that is positioned above the lift is raised and is positioned for maintenance, such as changing of tires, wheels and tracks.

18 Claims, 4 Drawing Sheets

ROLLING VEHICLE JACK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to vehicle jacks and more particularly pertains to a new vehicle jack for elevating a vehicle.

BRIEF SUMMARY OF THE INVENTION

An embodiment of the disclosure meets the needs presented above by generally comprising a base. A spring is coupled to a top of the base and is positioned in an internal space of the base. A sphere is rollably coupled to the spring and selectively extensible through a penetration that is positioned through a bottom of the base. A lift is coupled to and selectively extensible from the top of the base. An actuator, positioned in the internal space, is coupled to the base and operationally coupled to the lift. The sphere is configured to roll on a surface such that the base is reversibly positionable under a vehicle. The actuator is positioned to motivate the lift to extend vertically from the base, wherein the sphere is retracted into the base. A vehicle that is positioned above the lift is raised and is positioned for maintenance, such as changing of tires, wheels and tracks.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
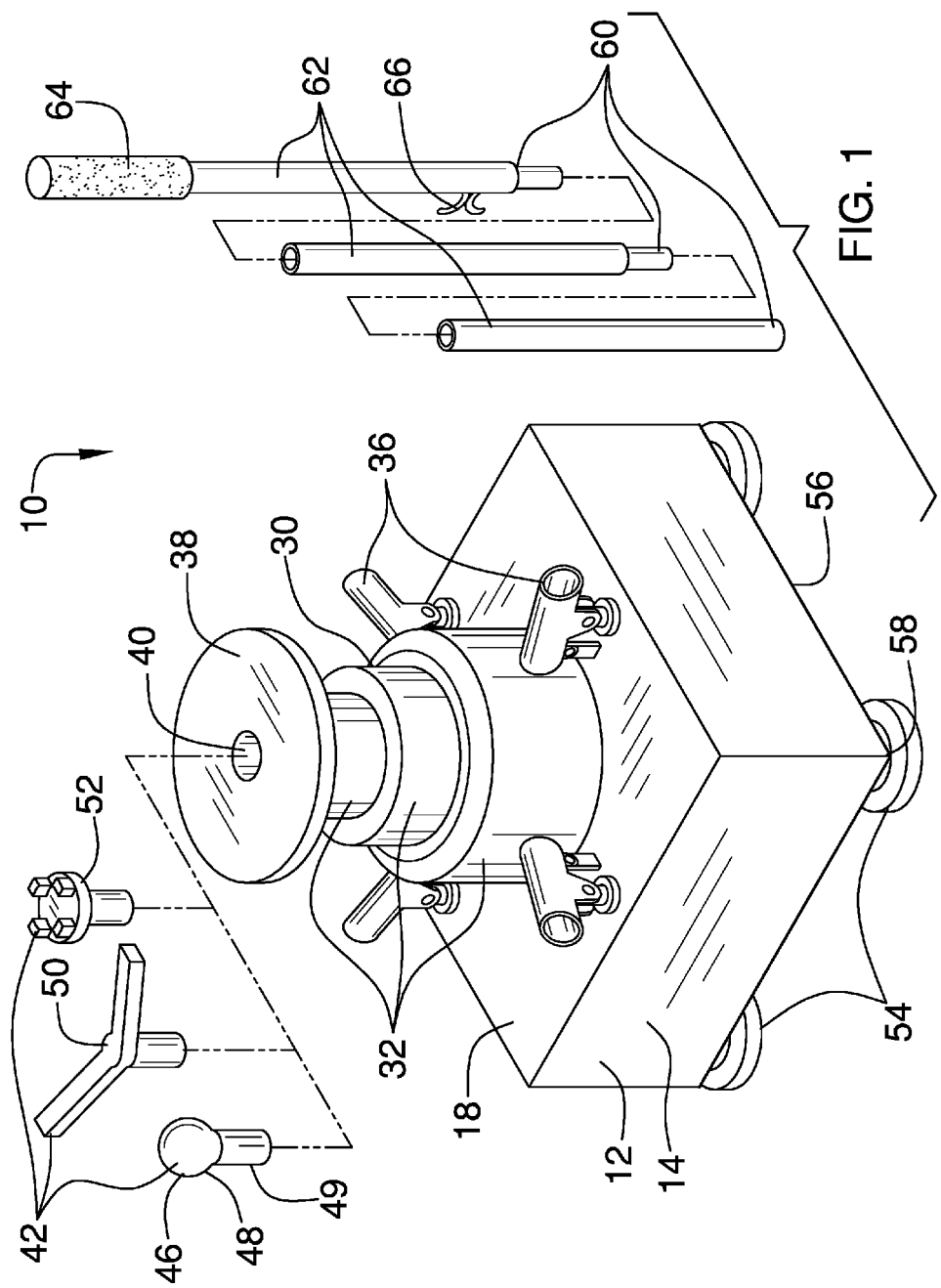
FIG. 1 is an isometric perspective view of a rolling vehicle jack according to an embodiment of the disclosure.
Figure 2:
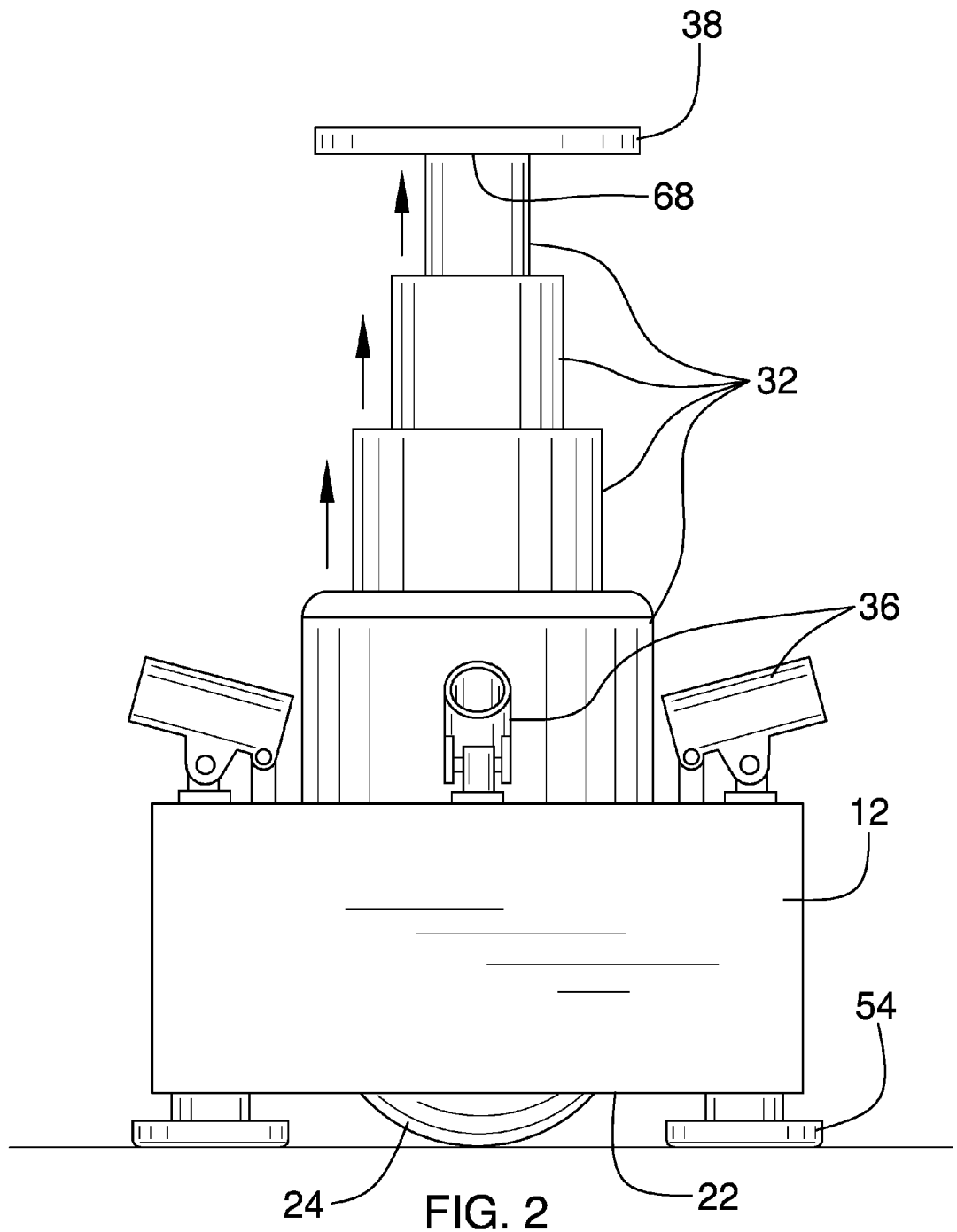
FIG. 2 is a side view of an embodiment of the disclosure.
Figure 3:
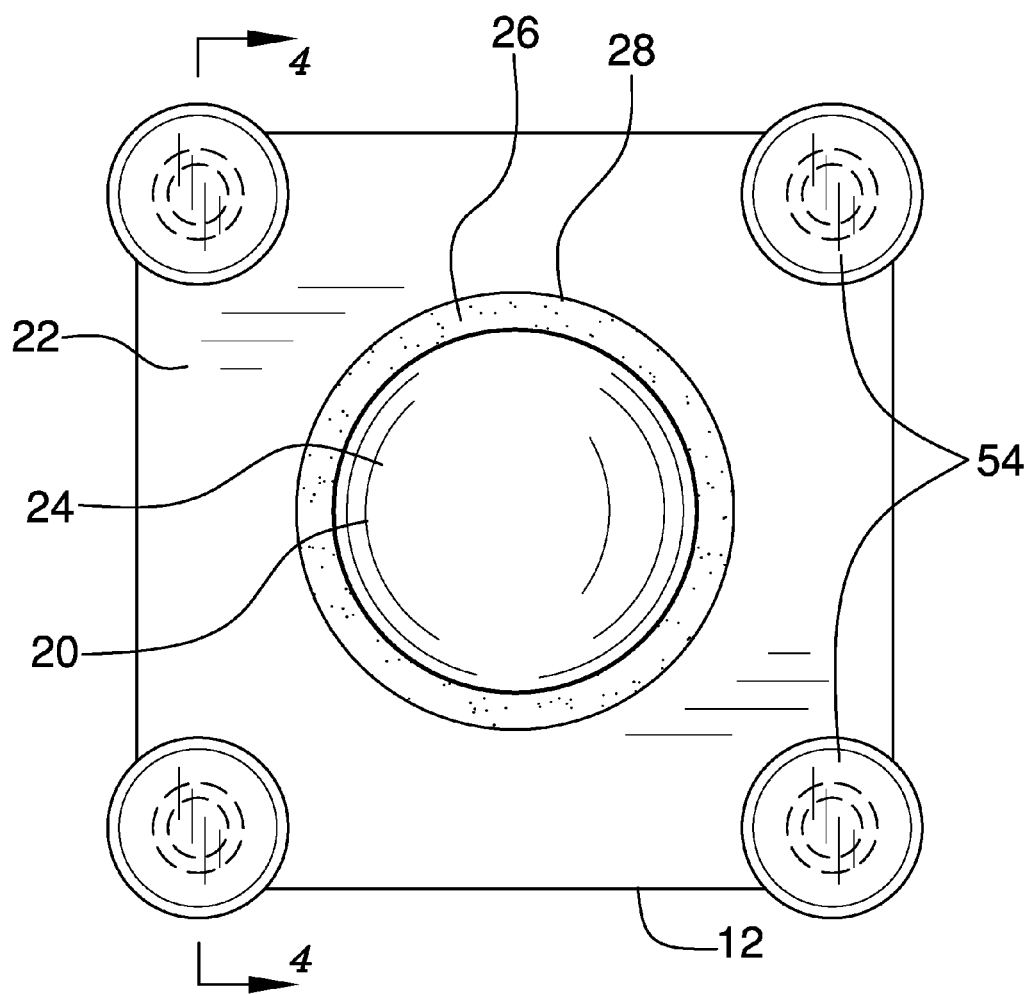
FIG. 3 is a bottom view of an embodiment of the disclosure.
Figure 4:
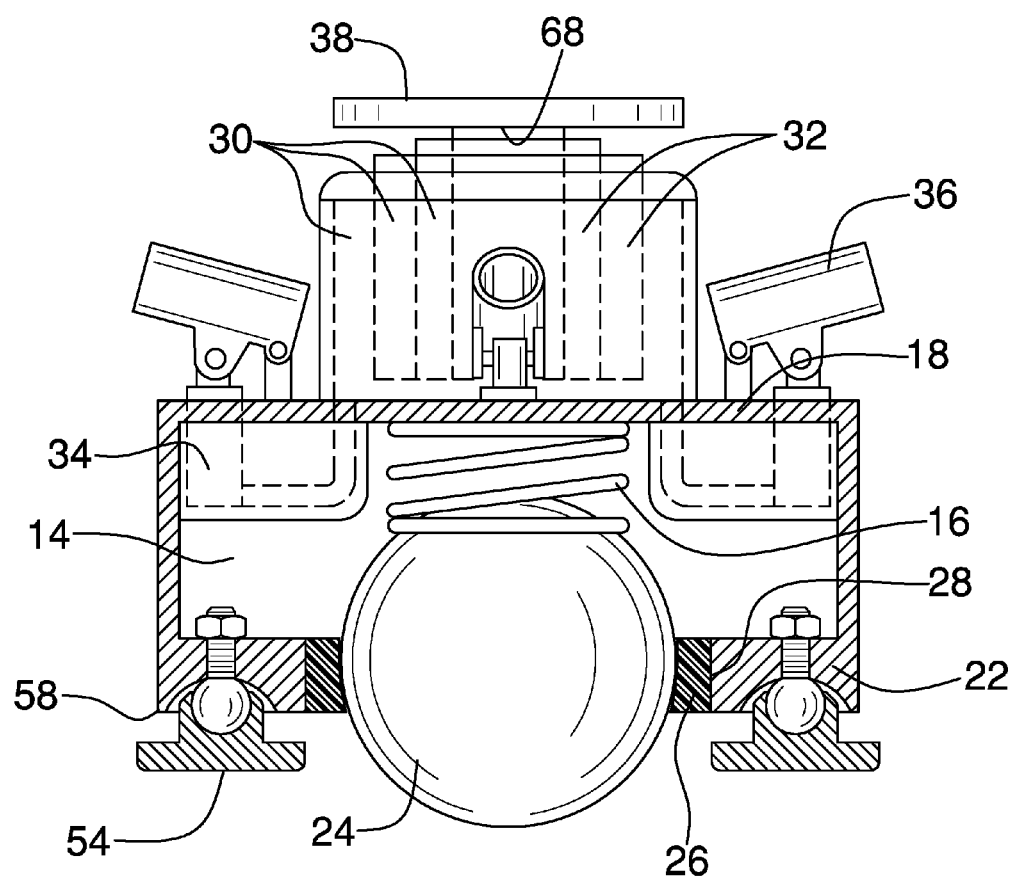
FIG. 4 is a cross-sectional view of an embodiment of the disclosure.

With reference now to the drawings, and in particular to FIGS. 1 through 4 thereof, a new vehicle jack embodying the principles and concepts of an embodiment of the disclosure and generally designated by the reference numeral 10 will be described.

As best illustrated in FIGS. 1 through 4, the rolling vehicle jack 10 generally comprises a base 12. The base 12 is substantially rectangularly box shaped and defines an internal space 14. A spring 16 is coupled to a top 18 of the base 12 and is positioned in the internal space 14 of the base 12. A penetration 20 is positioned through a bottom 22 of the base 12. The penetration 20 is circular.

A sphere 24 is rollably coupled to the spring 16. The sphere 24 is selectively extensible through the penetration 20. The sphere 24 is positioned on the spring 16 such that the sphere 24 is configured to roll on a surface such that the base 12 is reversibly positionable under a vehicle.

A bushing 26 is coupled to the base 12 around a circumference 28 of the penetration 20. The bushing 26 is positioned on the base 12 such that the sphere 24 is positioned to roll over the bushing 26 as the sphere 24 extends from and retracts into the internal space 14 through the penetration 20.

A lift 30 is coupled to the top 18 of the base 12. The lift 30 is selectively extensible from the base 12. The lift 30 is tubular. In one embodiment, the lift 30 is substantially circular when viewed longitudinally. The lift 30 comprises a plurality of nested sections 32. In one embodiment, the plurality of nested sections 32 comprises four nested sections 32.

An actuator 34 is coupled to the base 12 and is positioned in the internal space 14. The actuator 34 is operationally coupled to the lift 30. The lift 30 is positioned on the base 12 such that the actuator 34 is positioned to motivate the lift 30 to extend vertically from the base 12, wherein the sphere 24 is retracted into the base 12. A vehicle that is positioned above the lift 30 is raised and is positioned for maintenance, such as changing of tires, wheels and tracks. In one embodiment, the actuator 34 is hydraulic. In another embodiment, The actuator 34 is pneumatic.

A plurality of cranks 36 pivotally is coupled to the top 18 of the base 12. The cranks 36 are tubular. Each crank 36 is operationally coupled to the actuator 34. The cranks 36 are positioned on the base 12 such that the cranks 36 are positioned to motivate the actuator 34 to extend the lift 30 from the base 12. In one embodiment, the plurality of cranks 36 comprises four cranks 36 that are positioned evenly around and proximate to the lift 30.

A plate 38 is coupled to an upper end 68 of the lift 30. The plate 38 is positioned on the lift 30 such that the plate 38 is configured to abut an underside of the vehicle as the lift 30 is extended. In one embodiment, the plate 38 is circular.

In one embodiment, an orifice 40 is centrally positioned through the plate 38. In this embodiment, the jack 10 comprises a plurality of attachments 42. Each attachment 42 comprises a neck 44 and a head 46. The neck 44 is complementary to the orifice 40 such that the neck 44 is positioned for selective insertion into the orifice 40 to position the head 46 above the plate 38. The head 46 is configured to abut the underside of the vehicle as the lift 30 is extended. In another embodiment, the plurality of attachments 42 comprises a first insert 48, a second insert 50 and a third insert 52. The head 46 of the first insert 48 is ball-shaped. The head 46 of the second insert 50 is Y-shaped. The head 46 of the third insert 52 is studded.

A plurality of feet 54 is coupled to the bottom 22 of the base 12 proximate to a perimeter 56 of the base 12. The feet 54 are self-leveling. The feet 54 are positioned on the base 12 such that the feet 54 are configured to contact the surface as the sphere 24 is retracted into the base 12. In one embodiment, the plurality of feet 54 comprises feet 54 is positioned singly proximate to corners 58 of the base 12.

The jack 10 comprises a handle 60 that is complementary to the cranks 36. The handle 60 is selectively insertable into a respective crank 36. The handle 60 is positioned to insert into the respective crank 36 such that the handle 60 is configured to motivate the respective crank 36 to motivate the actuator 34. In one embodiment, the handle 60 comprises a plurality of connectable sections 62. Respective connectable sections 62 are selectively couplable such that the handle 60 is length adjustable. In another embodiment, the plurality of connectable sections 62 comprises three connectable sections 62.

A grip 64 is coupled proximate to an end of the handle 60. The grip 64 is positioned on the handle 60 such that the grip 64 is configured to be grasped in a hand of a user.

A hook 66 is coupled to the handle 60. The hook 66 is positioned on the handle 60 such that the hook 66 is positioned to couple to the base 12 such that the base 12 is maneuverable upon the sphere 24 for reversible positioning under the vehicle.

In use, the sphere 24 is positioned on the spring 16 such that the sphere 24 is configured to roll on a surface to reversibly position the base 12 is under a vehicle. The handle 60 is positioned to insert into a respective crank 30. The handle 60 is configured to motivate the respective crank 36 to motivate the actuator 34 to motivate the lift 30 to extend vertically from the base 12, wherein the sphere 24 is retracted into the base 12. A vehicle that is positioned above the lift 30 is raised and is positioned for maintenance, such as changing of tires, wheels and tracks.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rolling vehicle jack comprising:
a base;
a spring coupled to a top of said base and positioned in an internal space of said base;
a penetration positioned through a bottom of said base, said penetration being circular;
a sphere rollably coupled to said spring, said sphere being selectively extensible through said penetration;
a lift coupled to said top of said base, said lift being selectively extensible from said base;
an actuator coupled to said base and positioned in said internal space, said actuator being operationally coupled to said lift; and
wherein said sphere is positioned on said spring such that said sphere is configured for rolling on a surface such that said base is reversibly positionable under a vehicle, wherein said lift is positioned on said base such that said actuator is positioned to motivate said lift to extend vertically from said base, wherein said sphere is retracted into said base, wherein a vehicle positioned above said lift is raised, such that the vehicle is positioned for maintenance, such as changing of tires, wheels and tracks.

2. The jack of claim 1, further including said base being substantially rectangularly box shaped defining said internal space.

3. The jack of claim 1, further including a bushing coupled to said base around a circumference of said penetration, wherein said bushing is positioned on said base such that said sphere is positioned to roll over said bushing as said sphere extends from and retracts into said internal space through said penetration.

4. The jack of claim 1, further including said lift being tubular, said lift being substantially circular when viewed longitudinally, said lift comprising a plurality of nested sections.

5. The jack of claim 4, further including said plurality of nested sections comprising four said nested sections.

6. The jack of claim 1, further including said actuator being hydraulic.

7. The jack of claim 6, further including a plurality of cranks pivotally coupled to said top of said base, said cranks being tubular, each said crank being operationally coupled to said actuator, wherein said cranks are positioned on said base such that said cranks are positioned to motivate said actuator to extend said lift from said base.

8. The jack of claim 7, further including said plurality of cranks comprising four said cranks positioned evenly around and proximate to said lift.

9. The jack of claim 7, further including a handle complementary to said cranks, said handle being selectively insertable into a respective said crank, wherein said handle is positioned for insertion into said respective said crank such that said handle is configured to motivate said respective said crank to motivate said actuator, said handle comprising a plurality of connectable sections, wherein respective connectable sections are selectively couplable such that said handle is length adjustable.

10. The jack of claim 9, further comprising:
said plurality of connectable sections comprising three said connectable sections;
a grip coupled proximate to an end of said handle, wherein said grip is positioned on said handle such that said grip is configured for grasping in a hand of a user; and
a hook coupled to said handle, wherein said hook is positioned on said handle such that said hook is positioned to couple to said base, such that said base is maneuverable upon said sphere for reversible positioning under the vehicle.

11. The jack of claim 1, further including said actuator being pneumatic.

12. The jack of claim 1, further including a plate coupled to an upper end of said lift, wherein said plate is positioned on said lift such that said plate is configured to abut an underside of the vehicle as said lift is extended, said plate being circular.

13. The jack of claim 12, further comprising:
an orifice centrally positioned through said plate;
a plurality of attachments, each said attachment comprising a neck and a head, said neck being complementary to said orifice such that said neck is positioned for selective insertion into said orifice positioning said head above said plate, wherein said head is configured to abut the underside of the vehicle as said lift is extended.

14. The jack of claim 13, further including said plurality of attachments comprising:
a first insert, said head of said first insert being ball-shaped;
a second insert, said head of said second insert being Y-shaped; and
a third insert, said head of said third insert being studded.

15. The jack of claim 1, further including a plurality of feet coupled to said bottom of said base proximate to a perimeter of said base, said feet being self-leveling, wherein said feet are positioned on said base such that said feet are configured to contact the surface as said sphere is retracted into said base.

16. The jack of claim 15, further including said plurality of feet comprising said feet positioned singly proximate to corners of said base.

17. A rolling vehicle jack comprising:
a base, said base being substantially rectangularly box shaped defining an internal space;
a spring coupled to a top of said base and positioned in said internal space of said base;
a penetration positioned through a bottom of said base, said penetration being circular;
a sphere rollably coupled to said spring, said sphere being selectively extensible through said penetration, wherein said sphere is positioned on said spring such that said sphere is configured for rolling on a surface such that said base is reversibly positionable under a vehicle;
a bushing coupled to said base around a circumference of said penetration, wherein said bushing is positioned on said base such that said sphere is positioned to roll over said bushing as said sphere extends from and retracts into said internal space through said penetration;
a lift coupled to said top of said base, said lift being selectively extensible from said base, said lift being tubular, said lift being substantially circular when viewed longitudinally, said lift comprising a plurality of nested sections, said plurality of nested sections comprising four said nested sections;
an actuator coupled to said base and positioned in said internal space, said actuator being operationally coupled to said lift, wherein said lift is positioned on said base such that said actuator is positioned to motivate said lift to extend vertically from said base, wherein said sphere is retracted into said base, wherein a vehicle positioned above said lift is raised, such that the vehicle is positioned for maintenance, such as changing of tires, wheels and tracks, said actuator being hydraulic;
a plurality of cranks pivotally coupled to said top of said base, said cranks being tubular, each said crank being operationally coupled to said actuator, wherein said cranks are positioned on said base such that said cranks are positioned to motivate said actuator to extend said lift from said base, said plurality of cranks comprising four said cranks positioned evenly around and proximate to said lift;
a plate coupled to an upper end of said lift, wherein said plate is positioned on said lift such that said plate is configured to abut an underside of the vehicle as said lift is extended, said plate being circular;
an orifice centrally positioned through said plate;
a plurality of attachments, each said attachment comprising a neck and a head, said neck being complementary to said orifice such that said neck is positioned for selective insertion into said orifice positioning said head above said plate, wherein said head is configured to abut the underside of the vehicle as said lift is extended, said plurality of attachments comprising a first insert, a second insert and a third insert, said head of said first insert being ball-shaped, said head of said second insert being Y-shaped, said head of said third insert being studded;
a plurality of feet coupled to said bottom of said base proximate to a perimeter of said base, said feet being self-leveling, wherein said feet are positioned on said base such that said feet are configured to contact the surface as said sphere is retracted into said base, said plurality of feet comprising said feet positioned singly proximate to corners of said base;
a handle complementary to said cranks, said handle being selectively insertable into a respective said crank, wherein said handle is positioned for insertion into said respective said crank such that said handle is configured to motivate said respective said crank to motivate said actuator, said handle comprising a plurality of connectable sections, wherein respective connectable sections are selectively couplable such that said handle is length adjustable, said plurality of connectable sections comprising three said connectable sections;
a grip coupled proximate to an end of said handle, wherein said grip is positioned on said handle such that said grip is configured for grasping in a hand of a user;
a hook coupled to said handle, wherein said hook is positioned on said handle such that said hook is positioned to couple to said base, such that said base is maneuverable upon said sphere for reversible positioning under the vehicle; and wherein said sphere is positioned on said spring such that said sphere is configured for rolling on a surface such that said base is reversibly positionable under a vehicle, wherein said handle is positioned for selective insertion into said respective said crank such that said handle is configured to motivate said respective said crank to motivate said actuator to motivate said lift to extend vertically from said base, wherein said sphere is retracted into said base, wherein a vehicle positioned above said lift is raised, such that the vehicle is positioned for maintenance, such as changing of tires, wheels and tracks.

18. The jack of claim 17, further including said actuator being pneumatic.

* * * * *